Dec. 16, 1958 R. SCHOSTAL 2,864,114
CLEANING DEVICE FOR CLEANING WINDOWS AND DISHES
Filed May 18, 1954 2 Sheets-Sheet 1
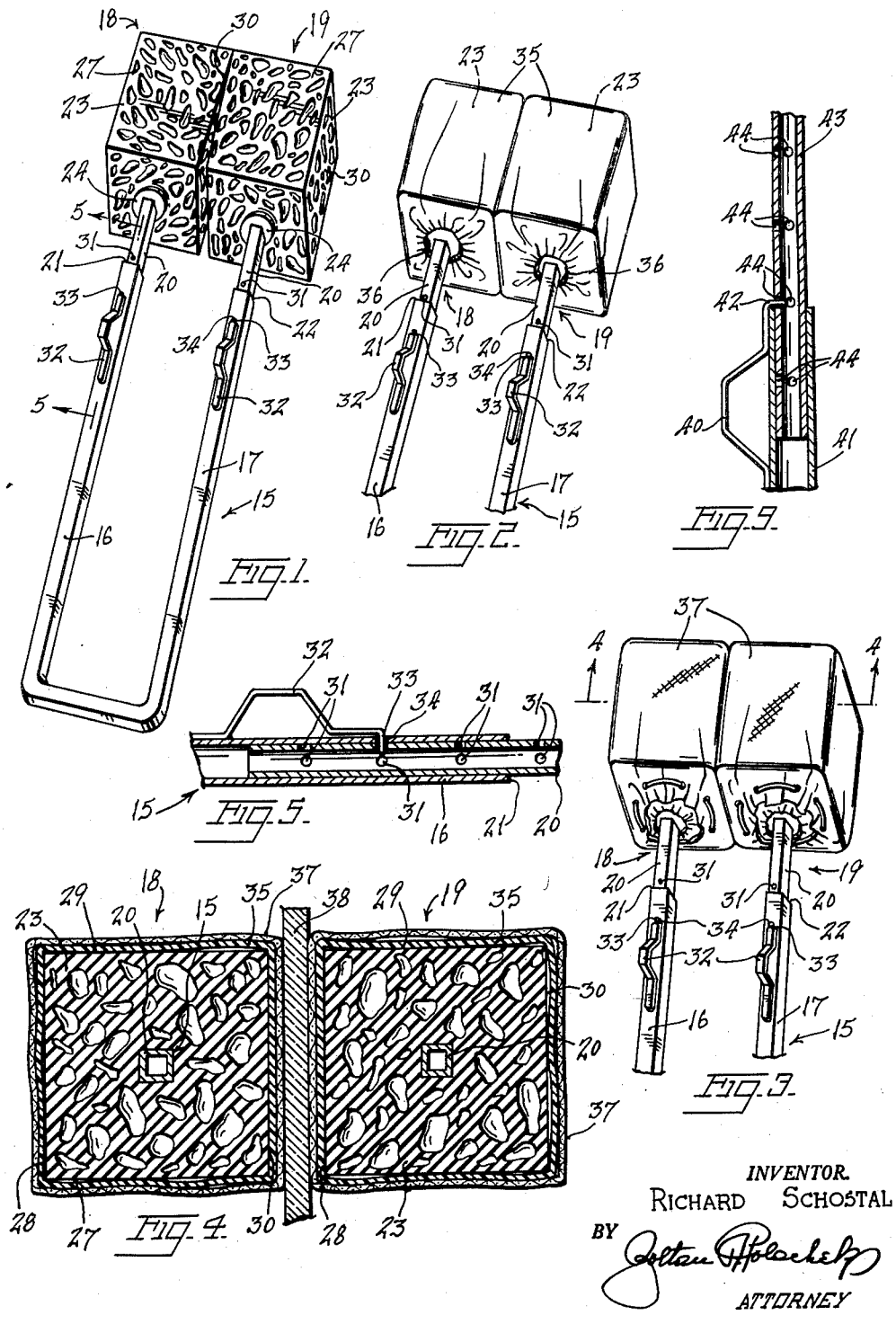
INVENTOR.
RICHARD SCHOSTAL
BY
ATTORNEY

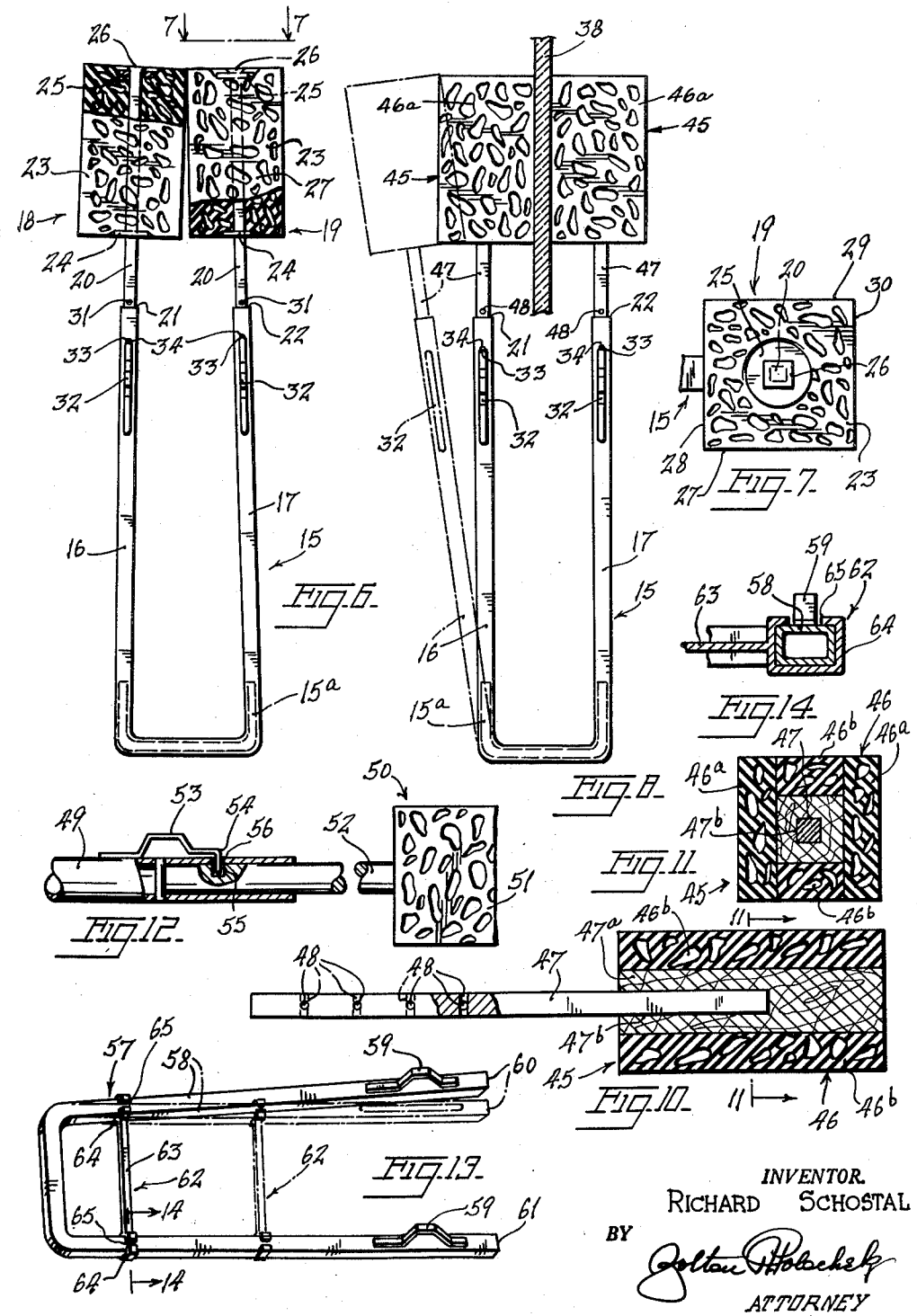

_Patented Dec. 16, 1958_

2,864,114

CLEANING DEVICE FOR CLEANING WINDOWS AND DISHES

Richard Schostal, Forest Hills, N. Y.

Application May 18, 1954, Serial No. 430,469

2 Claims. (Cl. 15—244)

This invention relates to new and useful improvements in cleaning devices.

More particularly, the present invention proposes the construction of an improved dish and window cleaning device of the type disclosed in my pending application, Serial Number 366,644, now Patent No. 2,759,211.

As a further object, the present invention proposes forming the cleaning device with a pair of cleaning members with cleaning surfaces of sponge or the like and providing a set of waterproof covers to enclose the sponge surface, and a pair of drying and polishing covers to fit over the water-proof covers on the cleaning surfaces.

Still further, the present invention proposes constructing the device with a U-shaped handle and the cleaning members with shank portions slidably and removable to fit in the handle arms with novel means to lock the cleaning members in a number of different positions to the handle arms.

Another object of the present invention is to provide a novel spreading means to spread apart the handle arms for straddling an object to be washed and yet not to interfere with the straddling after the cleaning members are disposed on opposite sides of the object.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a dish and window cleaning device constructed and arranged in accordance with the present invention.

Fig. 2 is a fragmentary view similar to Fig. 1 but showing waterproof covers encasing the cleaning surfaces.

Fig. 3 is a view similar to Fig. 2 but showing drying and polishing covers over the waterproof covers.

Fig. 4 is a sectional view taken on lines 4—4 of Fig. 3 but showing in section a portion of a window glass being dried and polished by the device.

Fig. 5 is a fragmentary sectional view taken on line 5—5 of Fig. 1.

Fig. 6 is a side view of the structure shown in Fig. 1 but with parts broken away and in section.

Fig. 7 is a view taken on line 7—7 of Fig. 6.

Fig. 8 is a view similar to Fig. 6 but showing a modification in cleaning position on a window glass, one cleaning element being shown in inoperative position in dot-dash lines.

Fig. 9 is a view similar to Fig. 5 but illustrating a further modification of the present invention.

Fig. 10 is an enlarged sectional view of a single cleaning member shown in Fig. 8, parts being shown broken away.

Fig. 11 is a sectional view taken on the line 11—11 of Fig. 10.

Fig. 12 is a view similar to Figs. 5 and 10 but illustrating a further modification of the present invention.

Fig. 13 is a perspective view of another handle for the device illustrating another modification of the invention.

Fig. 14 is a sectional view taken on line 14—14 of Fig. 13.

The dish and window cleaning device in accordance with the first form of the invention illustrated in Figs. 1 to 7, inclusive, has a U-shaped handle 15, preferably of square metal hollow tubing, with a pair of spaced stiffly flexible spring arms 16 and 17. A U-shaped device 15a housed in the handle at its base presses the free ends of the arms toward each other.

A pair of cleaning members 18 and 19, identically constructed, are provided with shank portions 20 of square tubing small enough slidably and removably to fit into the open free ends 21 and 22 of the handle arms 16 and 17 respectively. Secured to the shank portions 20 of the cleaning members 18 and 19 are sponges 23 disposed between washers 24 fixed to the shank portions and end washers 25 slidably fitting over the upper ends of the shank portions and held thereon by peening over the free end 26 of shank portion 20. The washers 24 and 25 are preferably cemented to the sponges 23 and these sponges 23 have cleaning surfaces 27, 28, 29 and 30 and shank portions 20 of the cleaning members 18 and 19 have a plurality of spaced openings 31 extending through adjacent sides of the shank portions.

Spring clamps 32 are fixed to the handle arms 16 and 17 adjacent the free ends 21 and 22 thereof. The spring clamps 32 each have a plunger or plunger portion 33 and these extend through plunger openings 34 in the handle arms selectively to fit into one of the plunger holes or openings 31 in the shank portions 20 of the cleaning members 18 and 19. In this manner, means are provided to lock the cleaning members to the handle arms. The cleaning members, due to the arrangement of the spaced openings 31 can be locked to the handle arms so that any one of their cleaning surfaces can be used.

Waterproof bags or covers 35 are provided for the sponges 23 the bags or covers fitting over and around the cleaning surfaces 27, 28, 29 and 30 of the cleaning members 18 and 19. Preferably, bags or covers 35 are made of thermoplastic sheet material with elastic mouth openings 36.

Similar bags or covers 37 of drying and polishing material such as cloth, paper, chamois or other material are provided to fit over the waterproof bags 35 when the bags 35 are over the sponges 23 of the cleaning members 18 and 19.

In this manner, the surfaces to be cleaned, such as window glass 38 can be washed with the sponges 23 and dried and polished by the bags or covers 37, the covers or bags 35 keeping the sponges from moistening the drying and polishing covers or bags 37.

The modification of the invention illustrated in Fig. 8 is characterized by the provision of a cleaning member 45 having a sponge 46 at one end and a solid square shank portion 47 with plunger openings 48 extending therethrough. The sponge 46 is preferably cemented to a wooden core 47a, having a longitudinal opening 47b partially extending into the wooden core 47a, adapted to receive the free end of the square shank portion 47.

The sponge 46 is made of two side strips 46a and two narrower end strips 46b in order to most economically produce the sponge 46.

The modification of the present invention illustrated in Fig. 9 is characterized by the provision of a spring clamp 40 secured to the handle arms 41 (only one being shown) and having a plunger 42 disposed beyond the free ends thereof. The shank portion 43 of each of the cleaning members is provided with spaced openings 44 removably to receive one of the plungers.

The modification of the invention illustrated in Fig. 12 is characterized by the provision of a handle 49 with arms of round hollow tubing and cleaning members such as cleaning member 50 illustrated. The cleaning member 50 has a sponge 51 secured at one end and a round rod shank portion 52 adapted for insertion in the handle arms. A spring clamp 53 is fixed to each handle arm. Each clamp 53 has a plunger 54 and openings 55 are provided in the shank portion 52 for the plungers, the handle arms each having an opening 56 to pass the plunger.

The modification of the invention illustrated in Figs. 13 and 14 is characterized by the provision of a U-shaped handle 57 having spaced stiffly flexible arms 58 with a spring clamps 59 at their free ends 60 and 61. In addition, a handle arm spreader 62 is slidably secured to both handle arms 58 so that by sliding the spreader bar 63 the handle arms 58 are forced apart enough to allow passage of cleaning members (not shown) held by the arms to pass over window frames and the like. The spreader 62 includes a spreader bar 63 attached to a pair of slide sleeves 64. These slide sleeves 64 are provided with openings 65 at one side, to permit the spreader 62 to be removed from or to slide on the U-shaped handle 57. In other respects, this form of the invention is similar to the previous forms.

While I have illustrated and described the preferred embodiments of my invention, it is to be understood that I do not limit myself to the precise constructions herein disclosed and the right is reversed to all changes and modifications coming within the scope of the invention as defined in the appended claims.

Having thus described my invention, what I claim as new, and desire to secure by United States Letters Patent is:

1. A dish and window cleaning device comprising a U-shaped handle with stiffly flexible spring arms, cleaning members each having a plurality of cleaning surfaces and slidably and removably secured to said handle arms, means to lock said cleaning members each in one of a plurality of positions along said arms, and means to vary the cleaning surfaces of said cleaning members, each cleaning member consisting of a wooden core square in cross-section and a sectional sponge covering the said core on all sides, said core having an axial socket receiving the free end of one of said arms, the said sponge constituting two pairs of oppositely located sponge sections cemented to the outer surface of the wooden core, one pair of the said sponge sections being one-half the width of the other pair.

2. A dish and window cleaning device comprising a U-shaped handle with stiffly flexible spring arms, cleaning members each having a tubular shank portion and a plurality of cleaning surfaces and slidably and removably secured to said handle arms, means to lock said cleaning members each in one of a plurality of positions along said arms, means to vary the cleaning surfaces of said cleaning members, said means to lock the cleaning members to the handle arms comprising spring clamps secured to the handle arms, said clamps each having a plunger and said shank portions of the cleaning members each having openings to selectively receive one of said plungers, said handle being of hollow tubing, and a U-shaped device housed in said handle at its base, the free ends of said device being slanted towards each other for pressing the free ends of the spring arms toward each other.

References Cited in the file of this patent

UNITED STATES PATENTS

| | | |
|---|---|---|
| 540,972 | Gale | June 11, 1895 |
| 610,726 | Ruete | Sept. 13, 1898 |
| 818,002 | Swain | Apr. 17, 1906 |
| 897,286 | Haskell | Sept. 1, 1908 |
| 1,644,642 | Horihata | Oct. 4, 1927 |
| 1,802,206 | Freuder | Apr. 21, 1931 |
| 1,984,154 | Pilato | Dec. 11, 1934 |
| 2,041,428 | Milligan | May 19, 1936 |
| 2,138,712 | Saffert | Nov. 29, 1938 |
| 2,413,854 | Berger | Jan. 7, 1947 |
| 2,759,211 | Schostal | Aug. 21, 1956 |

FOREIGN PATENTS

| | | |
|---|---|---|
| 15,892 | Great Britain | Oct. 7, 1890 |
| 51,665 | Norway | Oct. 24, 1932 |